United States Patent [19]

Mentink et al.

[11] Patent Number: 5,304,545
[45] Date of Patent: Apr. 19, 1994

[54] PROCESS OF REFINING MIXTURES OBTAINED FROM TREATMENTS OF FATTY MEDIA WITH CYCLODEXTRIN AND CONTAINING COMPLEXES OF CYCLODEXTRIN WITH LIPOPHILIC COMPOUNDS OF THE FATTY ACID TYPE

[75] Inventors: Léon Mentink, Estaires; Michel Serpelloni, Beuvry Les Bethune, both of France

[73] Assignee: Roquette Freres, France

[21] Appl. No.: 647,050

[22] Filed: Jan. 29, 1991

[30] Foreign Application Priority Data

Jan. 29, 1990 [FR] France ................. 9001008

[51] Int. Cl.$^5$ ................. A01N 43/04; A01K 31/715; C09F 5/10
[52] U.S. Cl. ................. 554/212; 536/102; 536/119; 426/572; 426/327; 424/439; 435/55; 554/175; 554/206
[58] Field of Search ............. 514/58, 59, 60; 536/119, 103, 102; 426/327, 572; 424/439; 435/55; 260/420

[56] References Cited

U.S. PATENT DOCUMENTS

| | | | |
|---|---|---|---|
| 3,491,132 | 1/1970 | Reiners et al. | 260/420 |
| 4,154,863 | 5/1979 | Kahn et al. | 426/327 |
| 4,282,263 | 8/1981 | Barnes et al. | 426/572 |
| 4,727,064 | 2/1988 | Pitha | 514/58 |
| 4,870,060 | 9/1989 | Müller | 514/58 |

OTHER PUBLICATIONS

Szejtl; et al.; "Inclusion complexes of unsaturated fatty acids with amylose and cyclodextrin"; vol. 27, No. 11, pp. 368–376; (1975).

*Primary Examiner*—Michael G. Wityshyn
*Assistant Examiner*—Louise N. Leary
*Attorney, Agent, or Firm*—Larson and Taylor

[57] ABSTRACT

Process of refining mixtures obtained from treatments of fatty media with cyclodextrin and containing complexes of cyclodextrin with lipophilic compounds of the fatty acid type, characterised by the fact that the said mixtures are subjected to a heat treatment at a temperature above 100° C. in the presence of a solvent system containing water, that the various fractions or raffinates obtained from the heat treatment are separated and that these raffinates are recovered.

10 Claims, No Drawings

PROCESS OF REFINING MIXTURES OBTAINED FROM TREATMENTS OF FATTY MEDIA WITH CYCLODEXTRIN AND CONTAINING COMPLEXES OF CYCLODEXTRIN WITH LIPOPHILIC COMPOUNDS OF THE FATTY ACID TYPE

The invention has as its object a process of refining mixtures obtained from treatments of fatty media with cyclodextrin and containing complexes of cyclodextrin with lipophilic compounds of the fatty acid type.

The term "fatty medium" denotes any substance containing fatty materials, in particular substances of biological origin, namely animal, such as fats from the group comprising tallow, lard, concentrated butter, fish oils, wool grease, blood, cerebro-spinal materials, egg, milk and their derivatives, and vegetable, such as vegetable oils or rosins.

Cyclodextrins are cyclic molecules of polyanhydroglucose having a truncated cone shaped tubular configuration enclosing a hydrophobic cavity. They are referred to respectively as alpha, beta or gamma cyclodextrin according to whether they are made up of 6, 7 or 8 anhydroglucose units.

With a view to simplification, the general term "cyclodextrin" will be used hereinafter to denote any of the alpha, beta or gamma cyclodextrins a mixture thereof or derivatives of cyclodextrins.

Cyclodextrin is prepared by the treatment of liquefied starch with an enzyme, the cyclodextrin glycosyl transferase.

Due to its particular toroidal structure, cyclodextrin has the property of selectively absorbing in its hydrophobic cavity various reactive groups and molecular types basically belonging to lipophilic substances. The affinity of these lipophilic substances for cyclodextrin (association constant) depends on their nature and their chemical configuration as well as their size relative to that of the cyclodextrin cavity, which in turn depends on the number of glucose residues.

This natural capacity for complex formation of cyclodextrin is beginning to be used commercially, in particular in the food industry, the phamaceutical and cosmetics industry and in industry in general.

Thus it has been proposed to use cyclodextrin in processes for the elimination and separation of undesirable compounds and for the recovery of valuable compounds from biological fatty media.

Among these processes may be mentioned the extraction of fatty acids from biological fatty media such as glyceridic vegetable oils (maize, sunflower, rape seed, peanut, soya and others).

Thus U.S. Pat. No. 3,491,132 describes a process for reducing the free fatty acid content of glyceridic oils by means of $\beta$-cyclodextrin Cyclodextrin has also been used for the purification of essential fatty acids which are polyunsaturated and therefore have a greater affinity for cyclodextrin than other fatty acids.

In these processes, cyclodextrin is brought into contact, in the presence of water, with the biological fatty medium containing the fatty acids which are to be removed or purified, the cyclodextrin being incorporated in a sufficient quantity to form complexes with the latter. Once formed, the complexes are in the aqueous phase which is separated from the fatty phase.

On an industrial scale, these aqueous residues containing the compounds to be removed or purified are products of extraction produced in very large quantities. For industries employing the said processes or using these lipophilic compounds as starting materials it would be of interest to be able to fractionate the said aqueous residues in order to recover in as pure a form as possible each of their important constituents and in particular cyclodextrin, which could then be recycled with a view to lowering the cost of the extraction process, and certain lipophilic substances such as rare or essential fatty acids (DHA, EPA, $\gamma$-linolenic acid, linoleic acid).

In an article entitled "Inclusion complexes of unsaturated fatty acid with amylose and cyclodextrins" by Szejtli et al, "Die Stärke" No.11 of 2.7.1975, pages 368 to 376, it has been proposed to use mixtures of water/hydrophilic solvent such as ethanol for extracting acids which have been converted into complexes with cyclodextrin. It must be emphasized that the product thus treated is simple since it only contains "cyclodextrin -fatty acid" complexes without any other compounds liable to interfère with the decomplexation as would be the case in biological media. Further, the yield of decomplexation obtained is poor. The complexes must be washed five times successively in order to extract the major part of the included fatty acids. Such a method would appear to be inapplicable for industrial use, in particular since it is both difficult to carry out and uneconomical.

U.S. Pat. No. 3,491,132 mentioned above describes a process of decomplexation in which the aqueous phase containing the complexes is diluted with water and the whole mixture is heated to boiling. The link between $\beta$-cyclodextrin and the fatty acids is broken and the latter can be recovered in the supernatant layer.

$\beta$-Cyclodextrin remains in the aqueous phase and may be recovered in a solid form after cooling.

The disadvantage of this process lies in particular in the fact that it only enables a small proportion of the fatty acids present in the initial mixture containing the complexes to be recovered so that $\beta$-cyclodextrin is only imperfectly purified and consequently difficult to recycle since it is liable to pollute the fatty material into which it would be introduced.

Further, this process does not enable the various types of fatty acids linked to a greater or less degree to cyclodextrin to be recovered in a fractionated form.

Lastly, the purification yields obtained by carrying out this process are so low that they are of no industrial interest.

It is a main object of this invention to overcome these disadvantages inherent in the prior art.

The Applicant Company has succeeded in finding as a result of extensive researches that it is possible to separate and purify the various components of the mixture obtained from the treatment of a fatty medium with cyclodextrin by subjecting the said mixture to a heat treatment in the presence of water at a temperature above 100° C.

The process according to the invention of refining mixtures obtained from treatments of fatty media with cyclodextrin is therefore characterised by the fact that the said mixtures are subjected to a heat treatment at a temperature above 100° C. in the presence of a solvent system containing water, that the various fractions or raffinates obtained from the heat treatment are separated and that these raffinates are recovered.

This heat treatment in an aqueous medium has the effect of at least partially dissociating the complexes of cyclodextrin /lipophilic compounds and of releasing the non-included lipophilic compounds from their link with cyclodextrin.

These substances separate easily from cyclodextrin, the major proportion of which, in relation to the quantity initially put into the process, is in the free form and can be directly recycled, thereby lowering the cost price.

The process according to the invention enables not only cyclodextrin to be recovered but also the starting fatty acids, either in a fractionated form or not.

These fatty acids or other fatty substances may be directly utilized as starting materials in the manufacture of food products, cosmetics, and others. Further, these fatty materials may be subjected to treatments of purification such as molecular distillation or modification such as saponification or esterification.

The respective proportions of dry starting mixture to be treated and solvent system vary from 0.02:1 to 4:1 parts by weight and preferably from 0.10:1 to 1:1 parts by weight.

The mixture is advantageously stirred at least prior to the heat treatment but also for the entire duration of the latter so as to homogenize the mixture and the solvent system.

Piston homogenizers of the ALMO type or helical homogenizers of the ULTRATURAX type or any other suitable apparatus known per se may be used for modifying the physical characteristics of the mixture in order to optimize its refinement.

According to the invention, the heat treatment is carried out at a temperature from 100° to 200° C., preferably from 100° to 150° C. and even more preferably from 115° to 125° C.

The treatment time may be from several seconds to several minutes and is preferably from 1 to 10 minutes, more preferably about 5 minutes.

According to one variation, the process according to the invention comprises a stage prior to the heat treatment, this stage consisting of heating the starting mixture to a temperature from 30° to 100° C. in the presence of the solvent system and of separating from the mixture thus treated those fatty substances which are least strongly linked to the cyclodextrin.

The fatty substances, mainly fatty acids, which are more strongly linked are liberated and recovered after the heat treatment according to the invention.

It thus becomes possible to recover and utilise the various fatty fractions separately.

The solvent system preferably consists entirely of water.

It is also possible, however, to use a solvent system composed of water and at least one product suitable for improving the decomplexating properties of the solvent system and/or for facilitating the separation of the components of the mixture.

This product is advantageously chosen from the group comprising polyols, sugars and alcohols.

A polyol from the group comprising glycerol, xylitol and sorbitol is preferably used, glycerol being more particularly preferred since it significantly facilitates the extraction of lipophilic compounds of the fatty acid type and their separation from the aqueous phase.

The water/glycerol ratio is preferably from 3:1 to 1:2 parts by weight, more preferably in the region of 1:1 parts by weight.

Separation of the various raffinates obtained from the heat treatment may be carried out by means of decanting or centrifuging. At least two phases are thus obtained hot, the first of which is of a fatty nature and of lower density than the solvent system and constitutes the supernatant phase while the second is formed by the solvent system itself (water alone or water/product) and contains the cyclodextrin.

A third phase may be observed, formed by the untreated residue of the initial mixture.

It should be noted that if the fatty phase has not been homogenized, it may itself consist of several phases, due to the various types of fatty substances of which it is composed.

To recover the cyclodextrin, the solvent phase is cooled to a sufficiently low temperature (for example, about 4° C.) to solidify the cyclodextrin. The mother liquors remaining may be recycled, in particular to the head of the process according to the invention.

The solvent system may also be evaporated to recover the cyclodextrin, a better yield being then obtained. If the solvent system consists of water alone, the cyclodextrin in solution may be used as such.

The untreated residue which is mainly in the form of the said third phase may be recycled.

When the product which promotes decomplexation is of the alcohol type, the heat treatment may be carried out at a lower temperature for obtaining an extraction yield identical to that obtained with a solvent system consisting of water alone and further, the yield of recovery of cyclodextrin may be improved by a reduction of its solubility in the cold.

In the case of a high concentration in alcohol, it is found that part of the lipophilic compounds of the fatty acid type are dissolved in the hydroalcoholic phase.

The process according to the invention may be carried out either statically or dynamically.

In both modes of operation, apparatus suitable for operating at the high pressures required for reaching the temperatures of the heat treatment are employed.

The static mode of operation consists of treating a predetermined volume of starting mixture in the presence of the solvent system by heating it to the required temperature by means of a heating apparatus such as an autoclave or a steam heater and then separating the various components obtained by decanting or centrifuging.

The static mode of operation is particularly advantageous when
 the quantities of the mixture to be refined are small,
 the solvent system employed contains particularly volatile substances such as alcohols or glycerol, or
 the characteristics of the solvent system are used not only for extracting but also for fractionating the lipophilic substances into a portion which is soluble in the solvent system and another which is insoluble.

The dynamic mode of operation consists of circulating the starting mixture in a heating apparatus after it has been homogenized with the solvent system. After the heat treatment, the mixture is conveyed to means for separating the various phases.

The latter may in particular consist of an apparatus of the decanting-centrifuge type, preferably of the continuously operating, self-cleaning type.

For the dynamic mode of operation, a steam injection boiler or thermochemical convertor commonly known as "jet-cooker" may advantageously be employed. Apparatus of this type are traditionally used for boiling starch for use as size in the paper/cardboad industry.

As example may be mentioned the heating device marketed by the Applicant Company under the name of HI-CAT cooker.

The principle of this apparatus consists of injecting steam into a heating coil inside which circulates the fluid to be heat treated, which in its known applications is the starch slurry.

The steam is injected in concurrence with the flow of fluid. It determines the pressure inside the circuit, which may be regulated by a counter-pressure valve situated close to the outlet end of the said circuit.

The treatment time depends on the volume of the heating coil and on the rate of flow of the fluid.

The heated fluid is recovered at the outlet of the coil after its pressure has been released in a cyclone and the steam has been evacuated.

In its application to the process according to the invention, the jet-cooker is equipped with at least one preparation vessel in which the starting mixture is homogenized with the solvent system. It advantageously also comprises separating means such as those mentioned above connected to the outlet end of the coil, namely a continuously operating self-cleaning centrifuge of the type marketed by the Westfalia Company.

The various raffinates formed in the process according to the invention may thus be collected at the outlet of the centrifuge, namely the lipophilic compounds, the non-included compounds or a mixture thereof, cyclodextrin and the untreated residue which may be directly introduced into the preparation vessel to be continuously recycled.

For the dynamic mode, a heat exchanger may also advantageously be used, for example a plate-type heat exchanger such as that marketed by Alfa-Laval under the Trade Mark "ALFA-FLEX". These heat exchangers may also be in the form of nests of tubes or with a roughened surface.

As in embodiments using a jet-cooker, at least one vessel for preparing the homogenized mixture containing the starting mixture and the solvent system is employed, this vessel being connected to the inlet of the exchanger while the outlet of the exchanger is connected to continuous separating means similar to those described above.

According to one variation, the heat treatment carried out in the dynamic mode consists of a steam distillation in which the steam is circulated through the mixture to be refined, which has been homogenised with the solvent system, so that the lipophilic compounds of the fatty acid type are extracted.

To optimize this treatment, the extraction is preferably carried out under a vacuum and the mixture homogenised with solvent system is circulated in countercurrent to the steam.

This type of steam distillation and the apparatus suitable for carrying it out are known as such and widely used, in particular for the deodorization of animal or vegetable fats.

According to the invention, it may be advantageous to combine one or more of the variations of this dynamic mode of operation.

The examples given above of apparatus suitable for heating the starting mixture in the presence of the solvent system, either statically or dynamically, are not limiting and any other apparatus producing the same result may be employed.

The invention will be better understood with the aid of the non-limiting Examples which follow and which relate to advantageous embodiments.

EXAMPLE 1

1. Treatment of a Fatty Medium by Means of Cyclodextrin

Corn oil from which the phospholipids have previously been extracted (demucilagination) and which has an acid index of 1.5 (expressed in % of oleic acid per 100 g) is treated with $\beta$-cyclodextrin (marketed under the Trade name KLEPTOSE by the Applicant Company) for extracting the free fatty acids and the breakdown products contained in this oil.

$\beta$-Cyclodextrin, which is in the form of a powder, is dispersed by stirring in the oil to be treated. Water is slowly added to form a coarse emulsion by stirring and at room temperature.

The whole mixture is then homogenized by stirring at 13,500 revs/minute for 1 minute, using a UNIMIX type of apparatus. A fine oil-in-water emulsion having a texture similar to that of a mayonnaise is thus obtained.

This emulsion is heated to 90° C. before being centrifuged at 6000 revs/minute for 5 minutes. Three phases are thus formed:

An oily phase which has an acid index of 0.6 after it has been washed with water and dried, an aqueous phase, a white centrifuge deposit.

It is this deposit which is subjected to the treatment according to the invention.

2. Refinement of the Deposit

The centrifuge deposit is mixed with 2 kg of water in the cold. The slurry obtained is heated in a thermochemical cooker of the type marketed by the Applicant Company under the name of "HI-CAT" with direct injection of steam.

The temperature in the heating coil is 120° C. and is obtained by the rate of flow of steam. The time required for the passage through the cooker is 5 minutes. At the outlet of the cooker, the heat treated mixture is continuously separated by means of a plate centrifuge of the type marketed by the Westfalia Company. Three phases are obtained:

A light phase composed of fatty materials which may be used for animal feeds or for the production of fatty acids or soaps, a heavy phase in the form of a deposit which corresponds to the initial, untreated product; it constitutes less than 10% of the starting material and may be recycled to the heat treatment, an aqueous phase of intermediate density containing a hot solution of 90% of the $\beta$-cyclodextrin initially present in the deposit to be refined; this aqueous phase may be used for the treatment of a fresh quantity of oil from which the phospholipids have previously been extracted or it may be slowly cooled to 4° C. for obtaining $\beta$-cyclodextrin crystals which can be separated by simple filtration.

EXAMPLE 2

1. Treatment of a Fatty Medium by Means of Cyclodextrin

A mixture of cod liver fatty acids is treated with a hydroalcoholic solution of $\beta$-cyclodextrin to extract the 15% by weight of $C_{18}$, $C_{20}$ and $C_{22}$ polyunsaturated fatty acids contained in the mixture.

100 g of the cod liver fatty acids are dispersed in 1 l of 70% ethanolic solution.

30 g of β-cyclodextrin (marketed under the Trade name KLEPTOSE by the Applicant Company) are added to this dispersion.

The whole is mixed at room temperature for 10 minutes and then left to stand for 2 hours at 4° C. 28 g (dry weight) of a precipitate containing about 12% by weight of fatty acids, 70% of which consist of the above-mentioned polyunsaturated fatty acids are formed and are separated by filtration.

This precipitate constitutes the mixture which is to be refined by the process according to the invention.

2. Refinement of the Precipitate 25 g of the above-mentioned precipitate are mixed with 100 g of a 30% aqueous solution of glycerol. The slurry obtained is introduced into a sterilizable "twist-off" glass container.

The whole mixture is autoclaved at 120° C. for 5 minutes. The following are collected in the heat after centrifugation:

A supernatant layer containing 96% of the fatty acid contained in the precipitate and a solution of β-cyclodextrin which may be used again for separating a mixture of fatty acids.

I claim:

1. In a method for removing cyclodextrin from complexes of cyclodextrin and fatty acids by the heat treatment of said complexes in the presence of water, the improvement which comprises effecting said treatment at a temperature above 100° C., in a proportion of complex to water of between 0.02:1 and 4:1 parts by weight on dry matter, and for a time sufficient to dissociate cyclodextrin from said complexes and recovering said cyclodextrin.

2. The method of claim 1, wherein the respective proportions of complexes to be treated and water are comprised between 0.10:1 and 1:1 parts by weight on dry matter.

3. The method of claim 1, wherein the heat treatment is carried out at a temperature from 100° to 200° C.

4. The method of claim 3, wherein the heat treatment is carried out at a temperature from 100° to 150° C.

5. The method of claim 4, wherein the heat treatment is carried out at a temperature from 115° to 125° C.

6. The method of claim 4, wherein the heat treatment is carried out in the presence of one product selected from the group consisting of sugars, polyols and alcohols.

7. The method of claim 6, wherein the heat treatment is carried out in the presence of glycerol.

8. The method of claim 7, wherein the water/glycerol ratio is comprised between 3:1 and 1:2 parts by weight.

9. The method of claim 8, wherein the water/glycerol ratio is in the region of 1:1 parts by weight.

10. The method of claim 1, wherein the heat treatment is performed in a thermochemical converter of a jet cooker.

* * * * *